United States Patent
Jonsson et al.

(10) Patent No.: US 7,235,600 B2
(45) Date of Patent: Jun. 26, 2007

(54) WATERBORNE COPOLYMER DISPERSION

(75) Inventors: Jan-Erik Jonsson, Lund (SE); Ola Karlsson, Lund (SE)

(73) Assignee: Celanese Emulsion Norden AB, Perstrop (SE)

( * ) Notice: Subject to any disclaimer, the term of this patent is extended or adjusted under 35 U.S.C. 154(b) by 163 days.

(21) Appl. No.: 10/522,567

(22) PCT Filed: Aug. 13, 2003

(86) PCT No.: PCT/SE03/01268

§ 371 (c)(1),
(2), (4) Date: Jan. 28, 2005

(87) PCT Pub. No.: WO2004/016700

PCT Pub. Date: Feb. 26, 2004

(65) Prior Publication Data

US 2006/0167186 A1    Jul. 27, 2006

(30) Foreign Application Priority Data

Aug. 16, 2002  (SE) ................................... 0202436

(51) Int. Cl.
*C08F 2/24* (2006.01)
*C08L 29/10* (2006.01)

(52) U.S. Cl. ...................... 524/562; 524/571; 524/802; 525/162; 525/902

(58) Field of Classification Search ................ 524/562, 524/571, 802; 525/162, 902
See application file for complete search history.

(56) References Cited

U.S. PATENT DOCUMENTS

| | | | |
|---|---|---|---|
| 5,292,795 A * | 3/1994 | Southwick et al. | ......... 524/562 |
| 5,332,640 A * | 7/1994 | Duff et al. | ............. 430/108.21 |
| 5,969,030 A | 10/1999 | Grandhee | |
| 6,683,145 B2 * | 1/2004 | Grandhee | ................ 526/307.7 |

FOREIGN PATENT DOCUMENTS

| | | |
|---|---|---|
| EP | 0 899 286 | 3/1999 |
| EP | 1 095 953 | 5/2001 |
| EP | 1 219 650 | 7/2002 |
| SE | 521 020 | 3/2001 |
| WO | WO 97/23539 | 7/1997 |
| WO | WO 97/30097 | 8/1997 |
| WO | WO 00/64975 | 11/2000 |
| WO | WO 02/33013 | 4/2002 |

* cited by examiner

*Primary Examiner*—James J. Seidleck
*Assistant Examiner*—Olga Asinovsky
(74) *Attorney, Agent, or Firm*—Buchanan Ingersoll & Rooney PC

(57) ABSTRACT

The present invention concerns a waterborne copolymer dispersion comprising at least one alkenyl functional dendritic polymer being copolymerized to the polymer backbone of at least one homo or copolymer obtainable by polymerization, such as emulsion polymerization, in an aqueous medium of at least one at least one polymerizable allyl, vinyl, maleic or diene monomer. The dendritic polymer is built up from a dendritic core polymer and at least one alkenyl functional compound bonded to the core polymer. In a further aspect the present invention concerns the use of said copolymer dispersion.

29 Claims, No Drawings

WATERBORNE COPOLYMER DISPERSION

The present invention refers to a waterborne copolymer dispersion comprising at least one alkenyl functional dendritic polymer being copolymerised to the polymer backbone of at least one homo or copolymer obtainable by polymerisation, such as emulsion polymerisation, in an aqueous medium. In a further aspect the present invention refers to the use of said copolymer dispersion.

Emulsion polymerisation is the most important industrial method for manufacture of aqueous dispersion polymers. Emulsion polymerisation is typically performed in an aqueous medium in the presence of a surfactant and a water-soluble initiator and is usually rapidly giving high molecular weight homo or copolymers at high solids content and low dispersion viscosity. The final product is normally an opaque, grey or milky-white dispersion of high molecular weight polymer(s) at a solids content of typically 30–60% in water. Said dispersion typically comprises acrylic, methacrylic and crotonic acid homo and copolymers, methacrylate and acrylate ester homo or copolymers, vinyl acetate homo or copolymers, vinyl and vinylidene chloride homo or copolymers, ethylene homo or copolymers, styrene and butadiene homo or copolymers, acrylamide homo or copolymers, butadiene-acrylonitrile copolymers, styrene-acrolein copolymers and/or where applicable carboxylated versions. Traditional applications for such aqueous dispersions are adhesives, binders for fibres and particulate matter, protective and decorative coatings, dipped goods, foam, paper coatings, backings for carpet and upholstery, modifiers for bitumens and concrete and thread and textile modifiers. More recent applications include biomedical applications as protein immobilisers, visual detectors in immunoassays, as release agents, in electronic applications as photoresists for circuit boards, in batteries, conductive paint, copy machines and as key components in molecular electronic devices.

Numerous recipes have been published, in the patent literature, in handbooks and the like, disclosing and discussing preparation and property improvements of homopolymer and copolymer dispersions. Despite many property improvements related to various dispersions and paints, glues etc. made therefrom, there are still need and demand for further improvements, such as improved blocking.

The present invention accordingly refers to a novel waterborne copolymer dispersion exhibiting, among other properties, substantially improved blocking properties. Said copolymer dispersion comprises 0.1–25%, such as 1–10% or 2–6%, by weight of at least one alkenyl functional dendritic polymer being built up from a dendritic core polymer and at least one alkenyl functional compound. The alkenyl functional dendritic polymer is copolymerised to the polymer backbone of at least one homo or copolymer obtainable by polymerisation in an aqueous medium of at least one polymerisable allyl, vinyl, maleic or diene monomer. The core polymer of said alkenyl functional dendritic polymer is optionally chain extended and said at least one alkenyl functional compound is added to said core polymer and/or said optional chain extension.

The alkenyl functional dendritic polymer is in preferred embodiments copolymerised to said polymer backbone in a one stage emulsion copolymerisation or copolymerised to a polymer backbone in a multi stage emulsion copolymerisation. Said emulsion copolymerisation may for instance yield latex particles having a heterogeneous morphology, such as a core-shell morphology. When monomers of different solubility or hydrophobicity are used, or when staged polymerisations are carried out, core-shell morphologies are possible. In staged polymerisations, spherical core-shell particles are made when a polymer made from a first monomer is more hydrophobic than a polymer made from a second monomer.

Said dendritic core polymer is advantageously and preferably a hydroxyfunctional dendritic polyester, polyether, polyesteramide or polyetheramide built up from alcohols, epoxies, oxetanes, aminoalcohols, hydroxyfunctional carboxylic acids, carboxylic acids or anhydrides, glycidyl esters and/or glycidyl ethers as disclosed in for instance WO 93/17060, WO 93/18075, WO 96/07688, WO 96/12754, WO 00/56802 and WO 01/16213. It is of course understood that alcohols, epoxies, oxetanes, aminoalcohols, hydroxyfunctional carboxylic acids, carboxylic acids or anhydrides, glycidyl esters and/or glycidyl ethers include mono, di, tri and polyfunctional compounds possessing necessary amount of reactive groups, sites and/or functions to yield and/or participate in formation of dendritic structures, including dendrimers. It is also understood that the hydroxyfunctionality of said dendritic core polymer may be derived from one or more hydroxyl, hydroxyalkyl, hydroxyalkoxy, hydroxyalkoxyalkyl, hydroxyalkylamide groups and the like.

The alkenyl functionality, of said alkenyl functional dendritic polymer, is in preferred embodiments obtained by addition, to said core polymer and/or its optional chain extension, of at least one aliphatic or aromatic unsaturated carboxylic acid or a corresponding anhydride or halide, at least one unsaturated carboxyfunctional ester, polyester, ether or polyether and/or obtained by reaction with at least one alkenyl halide. The alkenyl functionality can for instance be obtained by addition of acrylic acid, methacrylic acid, crotonic acid, isocrotonic acid or a to a said acid corresponding anhydride or halide. Further suitable alkenyl functional compounds, added to said core polymer and/or its optional chain extension, include unsaturated monoacids, such as soybean fatty acid, linseed fatty acid, tall oil fatty acid, castor fatty acid, dehydrated castor fatty acid, sunflower fatty acid, oleic acid, linoleic acid and linolenic acid and diacids, such as maleic acid, or its anhydride, and fumaric acid. Alkenyl functionality can also be obtained by reaction with for instance at least one alkenyl halide, such as allyl chloride and/or allyl bromide.

Said alkenyl functionality can, furthermore, be obtained by addition of an unsaturated carboxyfunctional ester of at least one saturated or unsaturated di, tri or polyfunctional carboxylic acid and at least one hydroxyfunctional (having at least one hydroxyl group) allyl ether of at least one di, tri or polyhydric alcohol or at least one di, tri or polyhydric reaction product between at least one alkylene oxide and at least one di, tri or polyhydric alcohol at least one hydroxyfunctional allyl ether of a di, tri or polyhydric alcohol. Said di, tri or polycarboxylic acid is, in these embodiments, suitably and preferably selected from the group consisting of maleic acid, fumaric acid, o-phthalic acid, isophthalic acid, terephthalic acid, tetrahydrophthalic acid, hexahydrophthalic acid, azelaic acid, adipic acid, trimelletic acid and a to a said acid corresponding anhydride. Said di, tri or polyhydric alcohol is likewise preferably a 1,ω-diol, 5,5-di(hydroxyalkyl)-1,3-dioxane, 2-alkyl-1,3-propanediol, 2,2-dialkyl-1,3-propanediol, 2-hydroxy-1,3-propanediol, 2-hydroxy-2-alkyl-1,3-propanediol, 2-hydroxyalkyl-2-alkyl-1,3-propanediol, 2,2-dihydroxyalkyl)-1,3-propanediol or a dimer, trimer or polymer of a said di, tri or polyhydric alcohol. Further embodiments include hydroxyfunctional allyl ethers and alkoxylates of a said polyhydric compound. Alkyl is in above disclosure preferably $C_1$–$C_{24}$ alkyl or $C_2$–$C_{24}$ alkenyl, such as $C_1$–$C_{12}$ or $C_2$–$C_8$ alkyl or alkenyl.

Suitable di, tri or polyhydric alcohols can be exemplified by and include compounds such as 1,4-butanediol, 1,5-pentanediol, 1,6-hexanediol, 1,6-cyclohexane dimethanol, 5,5-dihydroxymethyl-1,3-dioxane, 2-methyl-1,3-propanediol, 2-methyl-2-ethyl-1,3-propanediol, 2-ethyl-2-butyl-1,3-propanediol, neopentyl glycol, dimethylolpropane, 1,1-dimethylolcyclohexane, glycerol, trimethylolethane, trimethylolpropane, diglycerol, ditrimethylolethane, ditrimethylolpropane, pentaerythritol, dipentaerythritol, anhydroenneaheptitol, sorbitol, mannitol, hydroxyfunctional allyl ethers and alkoxylates of a said polyhydric compound.

Alkoxylates as disclosed above are to be understood as reaction products between at least one alkylene oxide, such as ethylene oxide, propylene oxide, 1,3-butylene oxide, 2,4-butylene oxide, cyclohexene oxide, butadiene monoxide and/or phenylethylene oxide, and at least one said di, tri or polyalcohol.

Said polymerisable monomer is in preferred embodiments suitably selected from the group consisting of acrylic acid, methacrylic acid, crotonic acid, isocrotonic acid, itaconic acid, maleic anhydride, fumaric acid, glycidyl acrylates, glycidyl methacrylates, acrylamide, methacrylamide, ethyl imidazolidon methacrylate, ethylene, propylene, styrene, divinylstyrene, vinylacetate, vinyl propionate, vinyl versatate, dibutyl maleate, butadiene, isoprene and $C_1$–$C_{10}$ alkyl acrylates and methacrylates, such as methyl acrylate, ethyl acrylate, butyl acrylate, 2-ethylhexyl acrylate, methyl methacrylate, ethyl methacrylate or butyl methacrylate.

Further embodiments of the dispersion according to the present invention include species comprising at least one polymerisable surfactant, such as a surfactant comprising at least one alkenyl group, and/or a conventional surfactant in combination with said at least one alkenylfunctional dendritic polymer.

In a further aspect, the present invention refers to the use of said novel waterborne copolymer dispersion, as disclosed above, in binders for coatings, such as decorative and/or protective paints and lacquers, adhesives and glues.

Without further elaboration, it is believed that one skilled in the art can, using the preceding description, utilise the present invention to its fullest extent. The following preferred specific embodiments are, therefore, to be construed as merely illustrative and not limitative of the remainder of the disclosure in any way whatsoever. In the following Examples 1–6 refer to preparations of dendritic polymers intended to be copolymerised to a polymer backbone of at least one homo or copolymer in accordance with embodiments of the present invention. Examples 7–17 and 19–27 illustrate preparation of copolymer dispersions according to embodiments of the present invention and Example 29 refers to preparation of white paints based on embodiment dispersions and blocking tests thereof. Said embodiment dispersions yield water-borne binders of the vinylacetate/ethylene co-polymer type, acrylic co-polymer type, styrene/acrylic co-polymer type or the like exhibiting significantly improved blocking resistance of both decorative clear coats and paints. Example 11, 18 and 28 are reference examples.

In more detail Examples 1–29 illustrate preparation of:

Example 1: A dendritic acrylate of the polyester type.

Example 2: A dendritic maleate of the polyester type.

Example 3: A dendritic allyl ether functional dendritic polyester.

Examples 4, 5 and 6: Unsaturated fatty acid modified dendritic polyesters.

Examples 7–9: Acrylic core-shell dispersions with various amounts of the dendritic polymer obtained in Example 1 copolymerised to the shell.

Example 10: Acrylic dispersion without dendritic polymer—Reference to Example 7–9.

Example 11: Acrylic one stage dispersion with the dendritic polymer obtained in Example 1.

Example 12: Vinyl acetate acrylic copolymer one stage dispersion with the dendritic polymer obtained in Example 1.

Examples 13–17: Acrylic core-shell dispersions with dendritic polymers obtained in Examples 2–5 copolymerised to the shell.

Example 18: Acrylic dispersion without dendritic polymer—Reference to Examples 13–17.

Examples 19–24: Acrylic core-shell dispersions with dendritic polymers obtained in Examples 4 and 6 using various monomer charging strategies.

Examples 25–27: Vinyl acetate/ethylene copolymer dispersions, having a core-shell morphology, with various amounts of the dendritic polymer obtained in Example 1 copolymerised to the shell.

Example 28: Vinyl acetate/ethylene copolymer without dendritic polymer—Reference to Examples 25–27.

Example 29: Preparation of white paints based on dispersions according to Examples 7–10 and 25–28 and blocking tests performed on films obtained from said paints.

EXAMPLE 1

300.0 g of a commercial dendritic polyester (Boltomm® H20, Perstorp Specialty Chemicals AB, Sweden), having a nominal molecular weight of 1750 g/mole and a hydroxyl value of 511 mg KOH/g, and 400 ml of toluene were charged to a three-necked 1 litre glass flask, equipped with a magnetic stirrer, a Dean-Stark water trap, a cooler, air purge and an oil bath with accurate temperature control. The temperature of the mixture was during 55 minutes gradually raised under stirring to a temperature corresponding to 85° C. in the oil bath. 237.22 g of acrylic acid (20% molar excess on to moles hydroxyl groups) and 4.83 g of methane sulphonic acid were charged to the reaction mixture and heating was continued. 10 drops of nitrobenzene ($\approx$140 ppm) and 0.75 g (1400 ppm) of 4-methoxy phenol were, when the temperature in the oil bath after 20 minutes reached 117° C., charged to the reaction mixture and air was slowly allowed to pass through the solution. After a further 35 minutes, corresponding to an oil bath temperature of 125° C., reaction water started to form. The reaction was allowed to continue for 9 hours until an acid value of 37.2 mg KOH/g was obtained. The temperature of was then decreased and 450 g of $Al_2O_3$ was, when an oil bath temperature of 70° C. was reached, charged to the reactor and the slurry was stirred for 2 hours and subsequently cooled to room temperature. The reaction slurry was now filtered through a pressure filter and a clear slightly yellow liquid was collected. Residual solvent was evaporated by means of a rotary evaporator under vacuum and at a temperature of 50° C., with a minor purge of air through the solution. The final product was a viscous liquid with the following properties:

| | |
|---|---|
| Molecular weight (nominal), g/mole: | 2614 |
| Acrylate functionality (nominal), eq: | 16 |
| Acrylate concentration (nominal), mmole/g: | 6.13 |
| Final acid value, mg KOH/g: | 3.0 |

-continued

| | |
|---|---|
| Viscosity (Brookfield, 23° C., mPas) | 54000 |
| Non-volatile content, % by weight: | 94.5 |
| Ash content (% as sulphate ash): | 0.146 |
| Colour (Gardner): | 3 |

EXAMPLE 2

300.0 g of a commercial dendritic polyester (Boltom® H30, Perstorp Specialty Chemicals AB, Sweden) having a nominal molecular weight of 3607 g/mole and a hydroxyl value of 490 mg KOH/g was charged to a 1 litre reactor equipped with a stirrer, a nitrogen purge and a cooler. The product was molten under stirring and 128.4 g of maleic anhydride was, when a transparent, viscous liquid was obtained at 90° C., charged to the reactor. An exotherm was observed when all maleic anhydride had dissolved in the reaction mixture. The exotherm was controlled by cooling and the reaction temperature at no single point allowed to exceed 100° C. The acid value was, when the exotherm had faded, found to be 183 mg KOH/g which was in good agreement with the expected acid value of 173 mg KOH/g and obtained product was cooled to room temperature.

The final product was a slightly yellow, transparent solid at room temperature with the following properties:

| | |
|---|---|
| Molecular weight (GPC), g/mole: | 2940 |
| Nominal molecular weight (GPC), g/mole: | 1896 |
| Maleate functionality (nominal), eq: | 16 |
| Maleate concentration (nominal), mmole/g: | 3.09 |
| Final acid value, mg KOH/g: | 182 |
| Glass transition temperature (DSC), ° C.: | 25 |
| Non-volatile content, % by weight: | 100.0 |
| Viscosity at 110° C., Pas: | 311 |

EXAMPLE 3

300.0 g of a commercial dendritic polyester (Boltorn® H20, Perstorp Specialty Chemicals AB, Sweden) having a nominal molecular weight of 1750 g/mole and a hydroxyl value of 511 mg KOH/g, 770.6 g of an adduct between trimethylolpropane diallylether (TMFDE, Perstorp Specialty Chemicals AB, Sweden) and succinic anhydride, said adduct having a nominal molecular weight of 314 g/mole and a nominal acid value of 179 mg KOH/g, 110 ml of heptane and 1.1 g of hydroquinone (≈1000 ppm) were charged to a 2 litres reactor equipped with a mechanical stirrer, a Dean-Stark water trap, a cooler and nitrogen purge. The reaction mixture was heated to 125° C., at which temperature reaction water started to form. The reaction was allowed to continue at said temperature for 8 hours until an acid value of 24 mg KOH/g was obtained. Full vacuum was now applied and heptane was evaporated and removed from reaction mixture. Obtained product was finally obtained.

The final product was a yellow viscous liquid at room temperature with the following properties:

| | |
|---|---|
| Molecular weight (nominal), g/mole: | 6012 |
| Allyl ether functionality (nominal), eq: | 28.8 |
| Allyl ether concentration (nominal), mmole/g: | 4.73 |
| Final acid value, mg KOH/g: | 21.9 |

-continued

| | |
|---|---|
| Hydroxyl value, mg KOH/g: | 15 |
| Viscosity (Brookfield, 23° C.), mPas: | 8200 |
| Non-volatile content, % by weight: | 94.5 |

EXAMPLE 4

350.0 g of a commercial dendritic polyester (Boltom® H20, Perstorp Specialty Chemicals AB, Sweden), having a nominal molecular weight of 1750 g/mole and a hydroxyl value of 511 mg KOH/g, and 822.5 g of tall oil fatty acid were charged to a 2 litres glass reactor equipped with a stirrer, a Dean-Stark water trap, a cooler and nitrogen purge. The reaction mixture was during 20 minutes heated from 23° C. to 103° C. and 11.7 g of benzoic acid was now added. The temperature had after a further 10 minutes reached 140° C. and 1.09 g of Ca(OH)$_2$ (s), 1.2 g of an organic tin catalyst and 75 ml of xylene were now charged to the reactor. The temperature of the reaction mixture was during 50 minutes further increased from 140° C. to 200° C., at which temperature reaction water started to form. The reaction was allowed to continue for a 9 hours until an acid value of 8.3 mg KOH/g was reached. The reaction product was cooled and a filtering aid was added and the mixture was passed through a pressure filter. Obtained clear solution was recharged to the reactor and was heated to 120° C. Full vacuum was now applied to remove residual xylene.

The final product was a low viscous clear, yellow liquid with the following properties:

| | |
|---|---|
| Molecular weight, g/mole: | 6176 |
| Molecular weight (nominal), g/mole: | 3135 |
| Number of unsaturated fatty acid groups, eq: | 14.4 |
| Final acid value, mg KOH/g: | 9.4 |
| Hydroxyl value, mg KOH/g: | 11 |
| Viscosity at 23° C. (Brookfield), mPas: | 875 |
| Non-volatile content, % by weight: | 100 |

EXAMPLE 5

This product was synthesised in a similar manner as the one in example 4, with the difference that 816.3 g of sun flower fatty acid was used instead of the amounts given by example 4.

The obtained product was a clear, low-viscous and yellow liquid with the following properties:

| | |
|---|---|
| Molecular weight, g/mole: | 6542 |
| Molecular weight (nominal), g/mole: | 5600 |
| Number of unsaturated fatty acid groups, eq: | 14.4 |
| Final acid value, mg KOH/g: | 5.1 |
| Hydroxyl value, mg KOH/g: | 15 |
| Viscosity at 23° C. (Brookfield), mPas: | 1200 |
| Non-volatile content, % by weight: | 100 |

EXAMPLE 6

Example 4 was repeated with the difference that 365 g of a commercial dendritic polyester (Boltorn® H40, Perstorp Specialty Chemicals AB, Sweden), having a nominal molecular weight of 7300 g/mole and a hydroxyl value of 485 mg KOH/g, was charged instead of 350.0 g of a commercial dendritic polyester (Boltorn® H20, Perstorp Specialty Chemicals AB, Sweden), having a nominal molecular weight of 1750 g/mole and a hydroxyl value of 511 mg KOH/g.

The final product was a clear, low-viscous and yellow liquid with the following properties:

| | |
|---|---|
| Molecular weight (nominal), g/mole: | 56230 |
| Number of unsaturated fatty acid groups, eq: | 58 |
| Final acid value, mg KOH/g: | 12.5 |
| Hydroxyl value, mg KOH/g: | 25 |
| Viscosity at 23° C. (Brookfield), mPas: | 11600 |
| Non-volatile content, % by weight: | 99.8 |

EXAMPLE 7

To a one litre glass reactor having an anchor stirrer was 163 parts per weight of water charged. The reactor was then heated to the polymerisation temperature of 82° C. In a separate vessel was a monomer emulsion prepared (hereafter in this example referred to as "Preem 1") by charging 175 parts per weight of water, 0.30 parts per weight of sodium hydroxide, 26.1 parts per weight of a surfactant mixture, 217.6 parts per weight of methyl methacrylate, 4.4 parts per weight of methacrylic acid, 211.7 parts per weight of butyl acrylate. The monomer water mixture was stirred rigorously in order to create a stable monomer in water emulsion, i.e., Preem 1. To the reactor was 43 parts per weight of Preem 1 charged together with 0.12 parts per weight of ammonium persulphate dissolved in 5 parts per weight of water. After the so called pre-reaction had ceased the remaining part of the Preem 1 was continuously added to the reactor for another 3.5 hours together with a solution of 1.53 parts per weight of ammonium persulphate dissolved in 73.5 parts per weight of water, which was added continuously for 4.5 hours. During the feeding of Preem 1 was another monomer emulsion prepared (hereafter in this example referred to as "Preem 2") by charging 46.2 parts per weight of water, 0.07 parts per weight of sodium hydroxide, 6.55 parts per weight of a surfactant mixture, 54.4 parts per weight of methyl methacrylate, 1.1 parts per weight of methacrylic acid, 52.9 parts per weight of butyl acrylate and 2.72 parts per weight of dendritic polymer obtained in Example 1. The monomer water mixture was stirred rigorously in order to create a stable monomer in water emulsion, i.e., Preem 2. Preem 2 was continuously added to the reactor for 1 hour immediately after the end of the feeding of Preem 1. After the continuous adding of Preem 2 and the ammonium persulphate solution was ended the reactor was kept at 82° C. for one more hour. The prepared dispersion was then allowed to cool to room temperature and a solution of a 2.75 parts per weight of a 25% ammonia mixed with 2.75 parts per weight of water was added. The properties of the ready dispersion are given in Table 1.

EXAMPLE 8

To a one litre glass reactor having an anchor stirrer was 163 parts per weight of water charged. The reactor was then heated to the polymerisation temperature of 82° C. In a separate vessel was a monomer emulsion prepared (hereafter in this example referred to as "Preem 1") by charging 175 parts per weight of water, 0.30 parts per weight of sodium hydroxide, 26.1 parts per weight of a surfactant mixture, 217.6 parts per weight of methyl methacrylate, 4.4 parts per weight of methacrylic acid, 211.7 parts per weight of butyl acrylate. The monomer water mixture was stirred rigorously in order to create a stable monomer in water emulsion, i.e., Preem 1. To the reactor was 43 parts per weight of Preem 1 charged together with 0.12 parts per weight of ammonium persulphate dissolved in 5 parts per weight of water. After the so called pre-reaction had ceased the remaining part of the Preem 1 was continuously added to the reactor for another 3.5 hours together with a solution of 1.53 parts per weight of ammonium persulphate dissolved in 73.5 parts per weight of water, which was added continuously for 4.5 hours. During the feeding of Preem 1 was another monomer emulsion prepared (hereafter in this example referred to as "Preem 2") by charging 46.2 parts per weight of water, 0.07 parts per weight of sodium hydroxide, 6.55 parts per weight of a surfactant mixture, 54.4 parts per weight of methyl methacrylate, 1.1 parts per weight of methacrylic acid, 52.9 parts per weight of butyl acrylate and 5.44 parts per weight of the dendritic polymer obtained in Example 1. The monomer water mixture was stirred rigorously in order to create a stable monomer in water emulsion, i.e., Preem 2. Preem 2 was continuously added to the reactor for 1 hour immediately after the end of the feeding of Preem 1. After the continuous adding of Preem 2 and the ammonium persulphate solution was ended the reactor was kept at 82° C. for one more hour. The prepared dispersion was then allowed to cool to room temperature and a solution of a 2.75 parts per weight of a 25% ammonia mixed with 2.75 parts per weight of water was added. The properties of the ready dispersion are given in Table 1.

EXAMPLE 9

To a one litre glass reactor having an anchor stirrer was 163 parts per weight of water charged. The reactor was then heated to the polymerisation temperature of 82° C. In a separate vessel was a monomer emulsion prepared (hereafter in this example referred to as "Preem 1") by charging 175 parts per weight of water, 0.30 parts per weight of sodium hydroxide, 26.1 parts per weight of a surfactant mixture, 217.6 parts per weight of methyl methacrylate, 4.4 parts per weight of methacrylic acid, 211.7 parts per weight of butyl acrylate. The monomer water mixture was stirred rigorously in order to create a stable monomer in water emulsion, i.e., Preem 1. To the reactor was 43 parts per weight of Preem 1 charged together with 0.12 parts per weight of ammonium persulphate dissolved in 5 parts per weight of water. After the so called pre-reaction had ceased the remaining part of the Preem 1 was continuously added to the reactor for another 3.5 hours together with a solution of 1.53 parts per weight of ammonium persulphate dissolved in 73.5 parts per weight of water, which was added continuously for 4.5 hours. During the feeding of Preem 1 was another monomer emulsion prepared (hereafter in this example referred to as "Preem 2") by charging 46.2 parts per weight of water, 0.07 parts per weight of sodium hydroxide, 6.55 parts per weight of a surfactant mixture, 54.4 parts per weight of methyl methacrylate, 1.1 parts per weight of methacrylic acid, 52.9 parts per weight of butyl acrylate and 10.9 parts per weight of the dendritic polymer obtained in Example 1. The monomer water mixture was stirred rigorously in order to create a stable monomer in water emulsion, i.e., Preem 2. Preem 2 was continuously added to the reactor for 1 hour immediately after the end of the feeding of Preem 1. After the continuous adding of Preem 2 and the ammonium persulphate solution was ended the reactor was kept at 82° C. for one more hour. The prepared dispersion was then allowed to cool to room temperature and a solution of a 2.75 parts per weight of a 25% ammonia mixed with 2.75 parts per weight of water was added. The properties of the ready dispersion are given in Table 1.

EXAMPLE 10

Reference

To a one litre glass reactor having an anchor stirrer was 163 parts per weight of water charged. The reactor was then heated to the polymerisation temperature of 82° C. In a separate vessel was a monomer emulsion prepared (hereafter in this example referred to as "Preem 1") by charging 175 parts per weight of water, 0.30 parts per weight of sodium hydroxide, 26.1 parts per weight of a surfactant mixture, 217.6 parts per weight of methyl methacrylate, 4.4 parts per weight of methacrylic acid, 211.7 parts per weight of butyl acrylate. The monomer water mixture was stirred rigorously in order to create a stable monomer in water emulsion, i.e., Preem 1. To the reactor was 43 parts per weight of Preem 1 charged together with 0.12 parts per weight of ammonium persulphate dissolved in 5 parts per weight of water. After the so called pre-reaction had ceased the remaining part of the Preem 1 was continuously added to the reactor for another 3.5 hours together with a solution of 1.53 parts per weight of ammonium persulphate dissolved in 73.5 parts per weight of water, which was added continuously for 4.5 hours. During the feeding of Preem 1 was another monomer emulsion prepared (hereafter in this example referred to as "Preem 2") by charging 46.2 parts per weight of water, 0.07 parts per weight of sodium hydroxide, 6.55 parts per weight of a surfactant mixture, 54.4 parts per weight of methyl methacrylate, 1.1 parts per weight of methacrylic acid, 52.9 parts per weight of butyl. The monomer water mixture was stirred rigorously in order to create a stable monomer in water emulsion, i.e., Preem 2. Preem 2 was continuously added to the reactor for 1 hour immediately after the end of the feeding of Preem 1. After the continuous adding of Preem 2 and the ammonium persulphate solution was ended the reactor was kept at 82° C. for one more hour. The prepared dispersion was then allowed to cool to room temperature and a solution of a 2.75 parts per weight of a 25% ammonia mixed with 2.75 parts per weight of water was added. The properties of the ready dispersion are given in Table 1.

EXAMPLE 11

To a one litre glass reactor having an anchor stirrer was 172.4 parts per weight of water charged. The reactor was then heated to the polymerisation temperature of 82° C. In a separate vessel was a monomer emulsion prepared by charging 164.3 parts per weight of water, 0.41 parts per weight of sodium hydroxide, 42.7 parts per weight of a surfactant mixture, 300,2 parts per weight of methyl methacrylate, 6.1 parts per weight of methacrylic acid, 292.1 parts per weight of butyl acrylate and 10.9 parts per weight of the dendritic polymer obtained in Example 1. The monomer water mixture was stirred rigorously in order to create a stable monomer in water emulsion. To the reactor was 43 parts per weight the monomer emulsion charged together with 0.13 parts per weight of ammonium persulphate dissolved in 5.1 parts per weight of water. After the so called pre-reaction had ceased the remaining part of the monomer emulsion was continuously added to the reactor for 4.5 hours together with a solution of 1.7 parts per weight of ammonium persulphate dissolved in 81.1 parts per weight of water. After the continuous adding of the monomer emulsion and the ammonium persulphate solution was ended the reactor was kept at 82° C. for one more hour. The prepared dispersion was then allowed to cool to room temperature and a solution of a 3.0 parts per weight of a 25% ammonia mixed with 3.0 parts per weight of water was added. The properties of the ready dispersion are given in Table 3.

EXAMPLE 12

The following ingredients were charged to a one litre glass reactor having an anchor stirrer was 452.5 parts per weight of water, 10.2 parts per weight of hydroxyethyl cellulose, 1.3 parts per weight of sodium bicarbonate and 21.6 parts per weight of a surfactant mixture. The reactor was then heated to the polymerisation temperature of 75° C. In a separate vessel was a monomer mixture prepared by charging 407.2 parts per weight of vinyl acetate, 101.8 parts per weight of butyl acrylate and 18.9 parts per weight of the dendritic polymer obtained in Example 1. To the reactor was 0.85 parts per weight of ammonium persulphate dissolved in 9.4 parts per weight of water charged. After the so called pre-reaction had ceased the monomer mixture was continuously added to the reactor for 4 hours together with a solution of 0.85 parts per weight of ammonium persulphate dissolved in 75.4 parts per weight of water. After the continuous adding of the monomer emulsion and the ammonium persulphate solution was ended the reactor was kept at 75° C. for one additional hour. The prepared dispersion was then allowed to cool to room temperature. The properties of the ready dispersion are given in Table 3.

EXAMPLE 13

To a one litre glass reactor having an anchor stirrer was 131.3 parts per weight of water charged. The reactor was then heated to the polymerisation temperature of 82° C. In a separate vessel was a monomer emulsion prepared (hereafter in this example referred to as "Preem 1") by charging 170.1 parts per weight of water, 0.3 parts per weight of a 46% sodium hydroxide solution, 35.6 parts per weight of a surfactant mixture, 217.4 parts per weight of methyl methacrylate, 4.3 parts per weight of methacrylic acid, 212 parts per weight of butyl acrylate, 7.6 parts per weight functional monomer. The monomer water mixture was stirred rigorously in order to create a stable monomer in water emulsion, i.e., Preem 1. To the reactor was 43 parts per weight of Preem 1 charged together with 0.22 parts per weight of ammonium persulphate dissolved in 4.1 parts per weight of water. After the so called pre-reaction had ceased the remaining part of the Preem 1 was continuously added to the reactor for another 3.5 hours together with a solution of 1.54 parts per weight of ammonium persulphate dissolved in 45.2 parts per weight of water, which was added continuously for 4.5 hours. During the feeding of Preem 1 was another monomer emulsion prepared (hereafter in this example referred to as "Preem 2") by charging 45.7 parts per weight of water, 0.07 parts per weight of a 46% sodium hydroxide solution, 8.9 parts per weight of a surfactant mixture, 54.3 parts per weight of methyl methacrylate, 1.1 parts per weight of methacrylic acid, 53 parts per weight of butyl acrylate and 5.8 parts per weight of the dendritic polymer obtained in Example 5. The monomer water mixture was stirred rigorously in order to create a stable monomer in water emulsion, i.e., Preem 2. Preem 2 was continuously added to the reactor for 1 hour immediately after the end of the feeding of Preem 1. After the continuous adding of Preem 2 and the ammonium persulphate solution were ended the reactor was kept at 82° C. for one more hour. The prepared dispersion was then allowed to cool to room temperature and a solution of a 2.75 parts per weight of a 25% ammonia mixed with 2.75 parts per weight of water was added. The properties of the ready dispersion are given in Table 2.

EXAMPLE 14

To a one litre glass reactor having an anchor stirrer was 131.3 parts per weight of water charged. The reactor was then heated to the polymerisation temperature of 82° C. In a separate vessel was a monomer emulsion prepared (hereafter in this example referred to as "Preem 1") by charging 170.1 parts per weight of water, 0.3 parts per weight of a 46% sodium hydroxide solution, 35.6 parts per weight of a surfactant mixture, 217.4 parts per weight of methyl methacrylate, 4.3 parts per weight of methacrylic acid, 212 parts per weight of butyl acrylate, 7.6 parts per weight functional monomer. The monomer water mixture was stirred rigorously in order to create a stable monomer in water emulsion, i.e., Preem 1. To the reactor was 43 parts per weight of Preem 1 charged together with 0.22 parts per weight of ammonium persulphate dissolved in 4.1 parts per weight of water. After the so called pre-reaction had ceased the remaining part of the Preem 1 was continuously added to the reactor for another 3.5 hours together with a solution of 1.54 parts per weight of ammonium persulphate dissolved in 45.2 parts per weight of water, which was added continuously for 4.5 hours. During the feeding of Preem 1 was another monomer emulsion prepared (hereafter in this example referred to as "Preem 2") by charging 45.7 parts per weight of water, 0.07 parts per weight of a 46% sodium hydroxide solution, 8.9 parts per weight of a surfactant mixture, 54.3 parts per weight of methyl methacrylate, 1.1 parts per weight of methacrylic acid, 53 parts per weight of butyl acrylate and 5.8 parts per weight of the dendritic polymer obtained in Example 5. The monomer water mixture was stirred rigorously in order to create a stable monomer in water emulsion, i.e., Preem 2. Preem 2 was continuously added to the reactor for 1 hour immediately after the end of the feeding of Preem 1. After the continuous adding of Preem 2 and the ammonium persulphate solution were ended the reactor was kept at 82° C. for one more hour. The prepared dispersion was then allowed to cool to room temperature and a solution of a 2.75 parts per weight of a 25% ammonia mixed with 2.75 parts per weight of water was added. The properties of the ready dispersion are given in Table 2.

EXAMPLE 15

To a one litre glass reactor having an anchor stirrer was 131.3 parts per weight of water charged. The reactor was then heated to the polymerisation temperature of 82° C. In a separate vessel was a monomer emulsion prepared (hereafter in this example referred to as "Preem 1") by charging 170.1 parts per weight of water, 0.3 parts per weight of a 46% sodium hydroxide solution, 35.6 parts per weight of a surfactant mixture, 217.4 parts per weight of methyl methacrylate, 4.3 parts per weight of methacrylic acid, 212 parts per weight of butyl acrylate, 7.6 parts per weight functional monomer. The monomer water mixture was stirred rigorously in order to create a stable monomer in water emulsion, i.e., Preem 1. To the reactor was 43 parts per weight of Preem 1 charged together with 0.22 parts per weight of ammonium persulphate dissolved in 4.1 parts per weight of water. After the so called pre-reaction had ceased the remaining part of the Preem 1 was continuously added to the reactor for another 3.5 hours together with a solution of 1.54 parts per weight of ammonium persulphate dissolved in 45.2 parts per weight of water, which was added continuously for 4.5 hours. During the feeding of Preem 1 was another monomer emulsion prepared (hereafter in this example referred to as "Preem 2") by charging 45.7 parts per weight of water, 0.07 parts per weight of a 46% sodium hydroxide solution, 8.9 parts per weight of a surfactant mixture, 54.3 parts per weight of methyl methacrylate, 1.1 parts per weight of methacrylic acid, 53 parts per weight of butyl acrylate and 5.8 parts per weight of the dendritic polymer obtained in Example 4. The monomer water mixture was stirred rigorously in order to create a stable monomer in water emulsion, i.e., Preem 2. Preem 2 was continuously added to the reactor for 1 hour immediately after the end of the feeding of Preem 1. After the continuous adding of Preem 2 and the ammonium persulphate solution were ended the reactor was kept at 82° C. for one more hour. The prepared dispersion was then allowed to cool to room temperature and a solution of a 2.75 parts per weight of a 25% ammonia mixed with 2.75 parts per weight of water was added. The properties of the ready dispersion are given in Table 2.

EXAMPLE 16

To a one litre glass reactor having an anchor stirrer was 131.3 parts per weight of water charged. The reactor was then heated to the polymerisation temperature of 82° C. In a separate vessel was a monomer emulsion prepared (hereafter in this example referred to as "Preem 1") by charging 170.1 parts per weight of water, 0.3 parts per weight of a 46% sodium hydroxide solution, 35.6 parts per weight of a surfactant mixture, 217.4 parts per weight of methyl methacrylate, 4.3 parts per weight of methacrylic acid, 212 parts per weight of butyl acrylate, 7.6 parts per weight functional monomer. The monomer water mixture was stirred rigorously in order to create a stable monomer in water emulsion, i.e., Preem 1. To the reactor was 43 parts per weight of Preem 1 charged together with 0.22 parts per weight of ammonium persulphate dissolved in 4.1 parts per weight of water. After the so called pre-reaction had ceased the remaining part of the Preem 1 was continuously added to the reactor for another 3.5 hours together with a solution of 1.54 parts per weight of ammonium persulphate dissolved in 45.2 parts per weight of water, which was added continuously for 4.5 hours. During the feeding of Preem 1 was another monomer emulsion prepared (hereafter in this example referred to as "Preem 2") by charging 45.7 parts per weight of water, 0.07 parts per weight of a 46% sodium hydroxide solution, 8.9 parts per weight of a surfactant mixture, 54.3 parts per weight of methyl methacrylate, 1.1 parts per weight of methacrylic acid, 53 parts per weight of butyl acrylate and 5.8 parts per weight of the dendritic polymer obtained in Example 3. The monomer water mixture was stirred rigorously in order to create a stable monomer in water emulsion, i.e., Preem 2. Preem 2 was continuously added to the reactor for 1 hour immediately after the end of the feeding of Preem 1. After the continuous adding of Preem 2 and the ammonium persulphate solution were ended the reactor was kept at 82° C. for one more hour. The prepared dispersion was then allowed to cool to room temperature and a solution of a 2.75 parts per weight of a 25% ammonia mixed with 2.75 parts per weight of water was added. The properties of the ready dispersion are given in Table 2.

EXAMPLE 17

To a one litre glass reactor having an anchor stirrer was 131.3 parts per weight of water charged. The reactor was then heated to the polymerisation temperature of 82° C. In a separate vessel was a monomer emulsion prepared (hereafter in this example referred to as "Preem I") by charging 170.1 parts per weight of water, 0.3 parts per weight of a 46% sodium hydroxide solution, 35.6 parts per weight of a surfactant mixture, 217.4 parts per weight of methyl methacrylate, 4.3 parts per weight of methacrylic acid, 212 parts per weight of butyl acrylate, 7.6 parts per weight functional monomer. The monomer water mixture was stirred rigorously in order to create a stable monomer in water emulsion, i.e., Preem 1. To the reactor was 43 parts per weight of Preem 1 charged together with 0.22 parts per weight of ammonium persulphate dissolved in 4.1 parts per weight of water. After the so called pre-reaction had ceased the remaining part of the Preem 1 was continuously added to the reactor for another 3.5 hours together with a solution of 1.54 parts per weight of ammonium persulphate dissolved in 45.2 parts per weight of water, which was added continuously for 4.5 hours. During the feeding of Preem 1 was another monomer emulsion prepared (hereafter in this example referred to as "Preem 2") by charging 45.7 parts per weight of water, 0.07 parts per weight of a 46% sodium hydroxide solution, 8.9 parts per weight of a surfactant mixture, 54.3 parts per weight of methyl methacrylate, 1.1 parts per weight of methacrylic acid, 53 parts per weight of butyl acrylate and 5.8 parts per weight of the dendritic polymer obtained in Example 2. The monomer water mixture was stirred rigorously in order to create a stable monomer in water emulsion, i.e., Preem 2. Preem 2 was continuously added to the reactor for 1 hour immediately after the end of the feeding of Preem 1. After the continuous adding of Preem 2 and the ammonium persulphate solution were ended the reactor was kept at 82° C. for one more hour. The prepared dispersion was then allowed to cool to room temperature and a solution of a 2.75 parts per weight of a 25% ammonia mixed with 2.75 parts per weight of water was added. The properties of the ready dispersion are given in Table 2.

EXAMPLE 18

Reference

To a one litre glass reactor having an anchor stirrer was 131.3 parts per weight of water charged. The reactor was then heated to the polymerisation temperature of 82° C. In a separate vessel was a monomer emulsion prepared (hereafter in this example referred to as "Preem I") by charging 170.1 parts per weight of water, 0.3 parts per weight of a 46% sodium hydroxide solution, 35.6 parts per weight of a surfactant mixture, 217.4 parts per weight of methyl methacrylate, 4.3 parts per weight of methacrylic acid, 212 parts per weight of butyl acrylate, 7.6 parts per weight functional monomer. The monomer water mixture was stirred rigorously in order to create a stable monomer in water emulsion, i.e., Preem 1. To the reactor was 43 parts per weight of Preem 1 charged together with 0.22 parts per weight of ammonium persulphate dissolved in 4.1 parts per weight of water. After the so called pre-reaction had ceased the remaining part of the Preem 1 was continuously added to the reactor for another 3.5 hours together with a solution of 1.54 parts per weight of ammonium persulphate dissolved in 45.2 parts per weight of water, which was added continuously for 4.5 hours. During the feeding of Preem 1 was another monomer emulsion prepared (hereafter in this example referred to as "Preem 2") by charging 45.7 parts per weight of water, 0.07 parts per weight of a 46% sodium hydroxide solution, 8.9 parts per weight of a surfactant mixture, 54.3 parts per weight of methyl methacrylate, 1.1 parts per weight of methacrylic acid and 53 parts per weight of butyl acrylate. The monomer water mixture was stirred rigorously in order to create a stable monomer in water emulsion, i.e., Preem 2. Preem 2 was continuously added to the reactor for 1 hour immediately after the end of the feeding of Preem 1. After the continuous adding of Preem 2 and the ammonium persulphate solution were ended the reactor was kept at 82° C. for one more hour. The prepared dispersion was then allowed to cool to room temperature and a solution of a 2.75 parts per weight of a 25% ammonia mixed with 2.75 parts per weight of water was added. The properties of the ready dispersion are given in Table 2.

EXAMPLE 19

To a one litre glass reactor having an anchor stirrer was 130 parts per weight of water charged. The reactor was then heated to the polymerisation temperature of 82° C. In a separate vessel was a monomer emulsion prepared by charging 245 parts per weight of water, 0.4 parts per weight of sodium hydroxide, 49.2 parts per weight of a surfactant mixture, 287 parts per weight of methyl methacrylate, 6 parts per weight of methacrylic acid, 280 parts per weight of butyl acrylate, 60 parts per weight of the dendritic polymer obtained in Example 4, 10 parts per weight functional monomer. The monomer water mixture was stirred rigorously in order to create a stable monomer in water emulsion. To the reactor was 25 parts per weight of the monomer emulsion charged together with 0.25 parts per weight of ammonium persulphate dissolved in 4 parts per weight of water. After the so called pre-reaction had ceased the remaining part of the monomer emulsion was continuously added to the reactor for 2.5 hours together with a solution of 1.7 parts per weight of ammonium persulphate dissolved in 60 parts per weight of water. The feeding to the reactor was stopped and 40 parts per weight of water was added to the monomer emulsion, which then was stirred rigorously again in order to create a stable monomer in water emulsion. The feeding of the monomer emulsion and the initiator solution was re-established and continued for 2 hours. After the continuous adding of the monomer emulsion and the ammonium persulphate solution were ended the reactor was kept at 82° C. for one more hour. The prepared dispersion was then allowed to cool to room temperature and a solution of a 1.7 parts per weight of a 25% ammonia mixed with 1.7 parts per weight of water was added. The properties of the ready dispersion are given in Table 3.

EXAMPLE 20

To a one litre glass reactor having an anchor stirrer was 130 parts per weight of water charged. The reactor was then heated to the polymerisation temperature of 82° C. In a separate vessel was a monomer emulsion prepared by charging 245 parts per weight of water, 0.4 parts per weight of sodium hydroxide, 49.2 parts per weight of a surfactant mixture, 287 parts per weight of methyl methacrylate, 6 parts per weight of methacrylic acid, 280 parts per weight of butyl acrylate, 60 parts per weight of the dendritic polymer obtained in Example 6, 10 parts per weight functional monomer. The monomer water mixture was stirred rigorously in order to create a stable monomer in water emulsion.

To the reactor was 25 parts per weight of the monomer emulsion charged together with 0.25 parts per weight of ammonium persulphate dissolved in 4 parts per weight of water. After the so called pre-reaction had ceased the remaining part of the monomer emulsion was continuously added to the reactor for 2.5 hours together with a solution of 1.7 parts per weight of ammonium persulphate dissolved in 60 parts per weight of water. The feeding to the reactor was stopped and 40 parts per weight of water was added to the monomer emulsion, which then was stirred rigorously again in order to create a stable monomer in water emulsion. The feeding of the monomer emulsion and the initiator solution was re-established and continued for 2 hours. After the continuous adding of the monomer emulsion and the ammonium persulphate solution were ended the reactor was kept at 82° C. for one more hour. The prepared dispersion was then allowed to cool to room temperature and a solution of a 1.7 parts per weight of a 25% ammonia mixed with 1.7 parts per weight of water was added. The properties of the ready dispersion are given in Table 3.

EXAMPLE 21

To a one litre glass reactor having an anchor stirrer was 150 parts per weight of water charged. The reactor was then heated to the polymerisation temperature of 82° C. In a separate vessel was a monomer emulsion prepared by charging 265 parts per weight of water, 0.4 parts per weight of sodium hydroxide, 49.2 parts per weight of a surfactant mixture, 227 parts per weight of methyl methacrylate, 6 parts per weight of methacrylic acid, 280 parts per weight of butyl acrylate, 10 parts per weight functional monomer. The monomer water mixture was stirred rigorously in order to create a stable monomer in water emulsion. To the reactor was 25 parts per weight of the monomer emulsion charged together with 0.25 parts per weight of ammonium persulphate dissolved in 4 parts per weight of water. After the so called pre-reaction had ceased the remaining part of the monomer emulsion was continuously added to the reactor for 2.5 hours together with a solution of 1.7 parts per weight of ammonium persulphate dissolved in 60 parts per weight of water. The feeding to the reactor was stopped and 60 parts per weight of methyl methacrylate and 60 parts per weight of the dendritic polymer obtained in Example 4 were added to the monomer emulsion, which then was stirred rigorously again in order to create a stable monomer in water emulsion. The feeding of the monomer emulsion and the initiator solution was re-established and continued for 2 hours. After the continuous adding of the monomer emulsion and the ammonium persulphate solution were ended the reactor was kept at 82° C. for one more hour. The prepared dispersion was then allowed to cool to room temperature and a solution of a 1.7 parts per weight of a 25% ammonia mixed with 1.7 parts per weight of water was added. The properties of the ready dispersion are given in Table 3.

EXAMPLE 22

To a one litre glass reactor having an anchor stirrer was 150 parts per weight of water charged. The reactor was then heated to the polymerisation temperature of 82° C. In a separate vessel was a monomer emulsion prepared by charging 265 parts per weight of water, 0.4 parts per weight of sodium hydroxide, 49.2 parts per weight of a surfactant mixture, 227 parts per weight of methyl methacrylate, 6 parts per weight of methacrylic acid, 280 parts per weight of butyl acrylate, 10 parts per weight functional monomer. The monomer water mixture was stirred rigorously in order to create a stable monomer in water emulsion. To the reactor was 25 parts per weight of the monomer emulsion charged together with 0.25 parts per weight of ammonium persulphate dissolved in 4 parts per weight of water. After the so called pre-reaction had ceased the remaining part of the monomer emulsion was continuously added to the reactor for 2.5 hours together with a solution of 1.7 parts per weight of ammonium persulphate dissolved in 60 parts per weight of water. The feeding to the reactor was stopped and 60 parts per weight of methyl methacrylate and 60 parts per weight of the dendritic polymer obtained in Example 6 were added to the monomer emulsion, which then was stirred rigorously again in order to create a stable monomer in water emulsion. The feeding of the monomer emulsion and the initiator solution was re-established and continued for 2 hours. After the continuous adding of the monomer emulsion and the ammonium persulphate solution were ended the reactor was kept at 82° C. for one more hour. The prepared dispersion was then allowed to cool to room temperature and a solution of a 1.7 parts per weight of a 25% ammonia mixed with 1.7 parts per weight of water was added. The properties of the ready dispersion are given in Table 3.

EXAMPLE 23

To a one litre glass reactor having an anchor stirrer was 133.1 parts per weight of water charged. The reactor was then heated to the polymerisation temperature of 82° C. In a separate vessel was a monomer emulsion prepared by charging 223.2 parts per weight of water, 0.3 parts per weight of sodium hydroxide, 38.5 parts per weight of a surfactant mixture, 130.8 parts per weight of methyl methacrylate, 4.7 parts per weight of methacrylic acid, 219.3 parts per weight of butyl acrylate, 7.8 parts per weight functional monomer. The monomer water mixture was stirred rigorously in order to create a stable monomer in water emulsion. To the reactor was 25 parts per weight of the monomer emulsion charged together with 0.2 parts per weight of ammonium persulphate dissolved in 3.1 parts per weight of water. After the so called pre-reaction had ceased the remaining part of the monomer emulsion was continuously added to the reactor for 2.5 hours together with a solution of 1.3 parts per weight of ammonium persulphate dissolved in 47 parts per weight of water. The feeding to the reactor was stopped and 94 parts per weight of methyl methacrylate and 94 parts per weight of the dendritic polymer obtained in Example 4 were added to the monomer emulsion, which then was stirred rigorously again in order to create a stable monomer in water emulsion. The feeding of the monomer emulsion and the initiator solution was re-established and continued for 2 hours. After the continuous adding of the monomer emulsion and the ammonium persulphate solution were ended the reactor was kept at 82° C. for one more hour. The prepared dispersion was then allowed to cool to room temperature and a solution of a 1.3 parts per weight of a 25% ammonia mixed with 1.3 parts per weight of water was added. The properties of the ready dispersion are given in Table 3.

EXAMPLE 24

To a one litre glass reactor having an anchor stirrer was 133.1 parts per weight of water charged. The reactor was then heated to the polymerisation temperature of 82° C. In a separate vessel was a monomer emulsion prepared by charging 223.2 parts per weight of water, 0.3 parts per weight of sodium hydroxide, 38.5 parts per weight of a surfactant mixture, 130.8 parts per weight of methyl methacrylate, 4.7 parts per weight of methacrylic acid, 219.3 parts per weight of butyl acrylate, 7.8 parts per weight functional monomer. The monomer water mixture was stirred rigorously in order to create a stable monomer in water emulsion. To the reactor was 25 parts per weight of the monomer emulsion charged together with 0.2 parts per weight of ammonium persulphate dissolved in 3.1 parts per weight of water. After the so called pre-reaction had ceased the remaining part of the monomer emulsion was continuously added to the reactor for 2.5 hours together with a solution of 1.3 parts per weight of ammonium persulphate dissolved in 47 parts per weight of water. The feeding to the reactor was stopped and 94 parts per weight of methyl methacrylate and 94 parts per weight of the dendritic polymer obtained in Example 6 were added to the monomer emulsion, which then was stirred rigorously again in order to create a stable monomer in water emulsion. The feeding of the monomer emulsion and the initiator solution was re-established and continued for 2 hours. After the continuous adding of the monomer emulsion and the ammonium persulphate solution were ended the reactor was kept at 82° C. for one more hour. The prepared dispersion was then allowed to cool to room temperature and a solution of a 1.3 parts per weight of a 25% ammonia mixed with 1.3 parts per weight of water was added. The properties of the ready dispersion are given in Table 3.

EXAMPLE 25

To a five litres pressure reactor was 1662 parts per weight of a solution charged, which consisted of 1472 parts per weight of water, 11 parts per weight of an anionic surfactant, 49 parts per weight of hydroxyethyl cellulose, 47 parts per weight of a functional monomer, 6 parts per weight of a pH buffer, 75 parts per weight of a nonionic surfactant solution. The reactor was then heated to the polymerisation temperature of 65° C. To the reactor were 148 parts per weight of vinyl acetate and 20 parts per weight of ethylene charged together with 1.7 parts per weight of ammonium persulphate dissolved in 50.5 parts per weight of water. After the so called pre-reaction had ceased were 1330 parts per weight of vinyl acetate and 131.25 parts per weight of ethylene continuously fed over three hours together with a solution of 2.5 parts per weight of ammonium persulphate dissolved in 73.5 parts per weight of water. Separately was a solution of 0.68 parts per weight of sodium metabisulphite dissolved in 80 parts per weight of water continuously charged to the reactor over three hours. In a separate vessel was a monomer mixture prepared by mixing 363 parts per weight of vinyl acetate and 16 parts per weight of the dendritic polymer obtained in Example 1. The monomer mixture was started to be fed to the reactor after three hours of reaction together with 44 parts per weight of ethylene and one solution consisting of 0.8 parts per weight of ammonium persulphate dissolved in 25 parts per weight of water and from a separate vessel was a solution consisting of 0.22 parts per weight of sodium metabisulphite dissolved in 27 parts per weight of water continuously charged to the reactor over one hour. After the continuous adding of the monomer mixtures and the initiator solutions were ended the reactor was kept at 65° C. for one more hour. The prepared dispersion was then allowed to cool to room temperature. The properties of the ready dispersion are given in Table 4.

EXAMPLE 26

To a five litres pressure reactor was 1662 parts per weight of a solution charged, which consisted of 1472 parts per weight of water, 11 parts per weight of anionic surfactant, 49 parts per weight of hydroxyethyl cellulose, 47 parts per weight of a functional monomer, 6 parts per weight of a pH buffer, 75 parts per weight of a nonionic surfactant solution. The reactor was then heated to the polymerisation temperature of 65° C. To the reactor were 148 parts per weight of vinyl acetate and 20 parts per weight of ethylene charged together with 1.7 parts per weight of ammonium persulphate dissolved in 50.5 parts per weight of water. After the so called pre-reaction had ceased were 1330 parts per weight of vinyl acetate and 131 parts per weight of ethylene continuously fed over three hours together with a solution of 2.5 parts per weight of ammonium persulphate dissolved in 73.5 parts per weight of water. Separately was a solution of 0.68 parts per weight of sodium metabisulphite dissolved in 80 parts per weight of water continuously charged to the reactor over three hours. In a separate vessel was a monomer mixture prepared by mixing 363 parts per weight of vinyl acetate and 20.5 parts per weight of the dendritic polymer obtained in Example 1. The monomer mixture was started to be fed to the reactor after three hours of reaction together with 44 parts per weight of ethylene and one solution consisting of 0.8 parts per weight of ammonium persulphate dissolved in 25 parts per weight of water and from a separate vessel was a solution consisting of 0.22 parts per weight of sodium metabisulphite dissolved in 27 parts per weight of water continuously charged to the reactor over one hour. After the continuous adding of the monomer mixtures and the initiator solutions were ended the reactor was kept at 65° C. for one more hour. The prepared dispersion was then allowed to cool to room temperature. The properties of the ready dispersion are given in Table 4.

EXAMPLE 27

To a five litres calorimetric pressure reactor was 1147 parts per weight of a solution charged, which consisted of 988 parts per weight of water, 14 parts per weight of a polymerisable surfactant solution consisting of 7 parts per weight of active material and 7 parts per weight of water, 51 parts per weight of hydroxyethyl cellulose, 6 parts per weight of a pH buffer, 87 parts per weight of a nonionic surfactant solution. The reactor was then heated to the polymerisation temperature of 72° C. To the reactor were 144 parts per weight of vinyl acetate, 0,2 parts per weight of a functional monomer and 21 parts per weight of ethylene charged together with 1.8 parts per weight of ammonium persulphate dissolved in 45.5 parts per weight of water. After the so called pre-reaction had ceased were 1455 parts per weight of vinyl acetate, 2,0 parts per weight of a functional monomer and 171 parts per weight of ethylene continuously fed over four hours together with a solution of 2.7 parts per weight of ammonium persulphate dissolved in 67.6 parts per weight of water. Separately was a solution of 25 parts per weight of a polymerisable surfactant solution consisting of 12.5 parts per weight of active material and 12.5 parts per weight of water, dissolved in 400 parts per weight of water continuously charged to the reactor over four hours. In a separate vessel was a Monomer mixture prepared by mixing 393 parts per weight of vinyl acetate and 22.5 parts per weight of the dendritic polymer obtained in Example 1. The monomer mixture was started to be fed to the reactor after four hours of reaction together with 43 parts per weight of ethylene and one solution consisting of 0.7 parts per weight of ammonium persulphate dissolved in 17 parts per weight of water and from a separate vessel a solution of 6 parts per weight of a polymerisable surfactant solution consisting of 3 parts per weight of active material and 3 parts per weight of water, dissolved in 100 parts per weight of water continuously charged to the reactor over one hour. After the continuous adding of the monomer mixtures and the ammonium persulphate solution were ended the reactor was kept at 72° C. for one more hour. The prepared dispersion was then allowed to cool to room temperature. The properties of the ready dispersion are given in Table 4.

EXAMPLE 28

Reference

To a five litres pressure reactor was 1662 parts per weight of a solution charged, which consisted of 1472 parts per weight of water, 11 parts per weight of anionic surfactant, 49 parts per weight of hydroxyethyl cellulose, 47 parts per weight of a functional monomer, 6 parts per weight of a pH buffer, 75 parts per weight of a nonionic surfactant solution. The reactor was then heated to the polymerisation temperature of 65° C. To the reactor were 197 parts per weight of vinyl acetate and 19 parts per weight of ethylene charged together with 1.7 parts per weight of ammonium persulphate dissolved in 50.5 parts per weight of water. After the so called pre-reaction had ceased were 1774 parts per weight of vinyl acetate and 175 parts per weight of ethylene continuously fed over four hours together with a solution of 3.4 parts per weight of ammonium persulphate dissolved in 98 parts per weight of water. Separately was a solution of 1 part per weight of sodium metabisulphite dissolved in 108 parts per weight of water continuously charged to the reactor over four hours. After the continuous adding of the monomer mixture and the initiator solutions were ended the reactor was kept at 65° C. for one more hour. The prepared dispersion was then allowed to cool to room temperature. The properties of the ready dispersion are given in Table 4.

EXAMPLE 29

White paints where prepared from in Examples 7–10 and 19–28 obtained dispersions and blocking tests were performed on obtained paints. Formulations and amounts are given in below table. All amounts are given in parts per weight.

Paint Formulation:

| | |
|---|---|
| Mill base, gloss 70 | 30.0 |
| Dispersion acc. to said Examples | 68.0 |
| Antifoam agent | 0.3 |
| Coalescent agent | 2.0 |

The mill base gloss 70 used in the prepared paints had the following composition:

| | |
|---|---|
| Titanium dioxide | 69.5 |
| Kaolin | 3.0 |
| Filler | 3.0 |
| Dispersing agent | 0.5 |
| Antifoam agent | 0.3 |

-continued

| | |
|---|---|
| Preservative | 0.2 |
| High molecular weight cellulose thickener, 2% in water | 10.0 |
| Low molecular weight cellulose thickener, 5% in water | 20.0 |
| Water | 2.7 |

The following blocking results were determined:

| | Dispersion acc. to Example | | | | | | | |
|---|---|---|---|---|---|---|---|---|
| | 7 | 8 | 9 | 10 Ref. | 25 | 26 | 27 | 28 Ref. |
| Blocking at 50% RH | 1.7 | 1.0 | 1.5 | 2.5 | 1.0 | 1.0 | 0.5 | 1.5 |

RH = Relative humidity.

Blocking was performed and evaluated according to following procedure:

Paint is applied using a 200 μm on foils and is allowed to dry at 23° C. and 50% relative humidity for 16 hours. Samples having the dimensions 4×4 cm are cut out from said foils and placed two and two, with the coated surfaces facing each other, between glass plates and loaded with a 2 kg weight. The loaded samples are now placed in a heating cabinet holding a temperature of 50° C. for 5 hours and subsequently cooled to room temperature. Evaluation of blocking is performed and judged by the ease to separate said samples. Judgement is visually performed according to a scale of 0–5, wherein 0 means no adhesion between the coated surfaces and/or no damage to the paint films.

TABLE 1

| | Example no. | | | |
|---|---|---|---|---|
| | 7 | 8 | 9 | 10 |
| Stage 1/Stage 2 | 80/20 | 79/21 | 79/21 | 80/20 |
| Dendritic polymer, % by weight* | 2.5 | 5 | 9 | — |
| Dendritic polymer of Example no. | 1 | 1 | 1 | — |
| Solids content, % | 52.2 | 52.2 | 51.8 | 51.9 |
| Viscosity at 23° C., Pas | 0.04 | 0.04 | 0.04 | 0.04 |

*In Stage 2 polymer.

TABLE 2

| | Example no. | | | | | |
|---|---|---|---|---|---|---|
| | 13 | 14 | 15 | 16 | 17 | 18 |
| Stage 1/Stage 2 | 79/21 | 79/21 | 79/21 | 79/21 | 79/21 | 79/21 |
| Dendritic polymer, % by weight* | 5 | 5 | 5 | 5 | 5 | — |
| Dendritic polymer of Example no. | 1 | 5 | 4 | 3 | 2 | — |
| Solids content, % | 55.6 | 55.7 | 55.1 | n.d. | n.d. | 58.8 |
| Viscosity at 23° C., Pas | 1.05 | 0.46 | 0.41 | n.d. | n.d. | 0.99 | n.d. = Not determined.
*In Stage 2 polymer.

TABLE 3

| | Example no. | | | | | | | |
|---|---|---|---|---|---|---|---|---|
| | 11 | 12 | 19 | 20 | 21 | 22 | 23 | 24 |
| Dendritic polymer, | 3 | 4 | 9 | 9 | 9 | 9 | 17 | 17 |

TABLE 3-continued

| | Example no. | | | | | | | |
|---|---|---|---|---|---|---|---|---|
| | 11 | 12 | 19 | 20 | 21 | 22 | 23 | 24 |
| % by weight Dendritic polymer of Example no. | 1 | 1 | 4 | 6 | 4 | 6 | 4 | 6 |
| Solids content, % | 56.2 | 47.5 | 56.8 | 56.3 | 54.4 | 54 | 54.5 | 53.5 |
| Viscosity at 23° C., Pas | 0.6 | 3.1 | 0.2 | 0.15 | 0.1 | 0.1 | 0.1 | 0.1 |

TABLE 4

| | Example no. | | | |
|---|---|---|---|---|
| | 25 | 26 | 27 | 28 |
| Dendritic polymer, % by weight | 0.7 | 1 | 1 | — |
| Dendritic polymer of Example no. | 1 | 1 | 1 | — |
| Solids content, % | 55 | 55 | 60 | 54.5 |
| Viscosity at 23° C., Pas | 5.6 | 3.3 | 2.3 | 4.7 |

The invention claimed is:

1. A waterborne copolymer dispersion comprising 0.1–25% by weight of at least one alkenyl functional dendritic polymer built up from a dendritic core polymer, which core polymer is a hydroxy-functional dendritic polyester, polyether, polyesteramide or polyetheramide and optionally is chain extended, and at least one alkenyl functional compound bonded to said core polymer and/or its optional chain extension, and that said alkenyl functional dendritic polymer is copolymerised to a polymer backbone of at least one homo or copolymer obtainable by polymerisation in an aqueous medium of at least one polymerisable allyl, vinyl, maleic or diene monomer.

2. A copolymer dispersion according to claim 1, wherein said at least one alkenyl functional dendritic polymer is copolymerised to said polymer backbone in a one stage emulsion copolymerisation.

3. A copolymer dispersion according to claim 1, wherein said at least one alkenyl functional dendritic polymer is copolymerised to polymer backbone in a multi stage emulsion copolymerisation.

4. A copolymer dispersion according to claim 2, wherein said emulsion copolymerisation yields latex particles having a heterogeneous morphology, such as a core-shell morphology.

5. A copolymer dispersion according to claim 1, wherein said dendritic core polymer is chain extended by addition of at least one alkylene oxide.

6. A copolymer dispersion according to claim 5, wherein said alkylene oxide is ethylene oxide, propylene oxide, 1,3-butylene oxide, 2,4-butylene oxide, cyclohexene oxide, butadiene monoxide and/or phenylethylene oxide.

7. A copolymer dispersion according to claim 1, wherein said alkenyl functionality is obtained by addition of at least one aliphatic or aromatic unsaturated carboxylic acid or a corresponding anhydride or halide.

8. A copolymer dispersion according to claim 7, wherein said alkenyl functionality is obtained by addition of acrylic acid, methacrylic acid, crotonic acid, isocrotonic acid, or a corresponding anhydride or halide; maleic acid or anhydride and/or fumaric acid; or soybean fatty acid, linseed fatty acid, tall oil fatty acid, castor fatty acid, dehydrated castor fatty acid, sunflower fatty acid, oleic acid, linoleic acid and/or linolenic acid.

9. A copolymer dispersion according to claim 1, wherein said alkenyl functionality is obtained by addition of at least one unsaturated carboxyfunctional ester, polyester, ether and/or polyether.

10. A copolymer dispersion according to claim 1, wherein said alkenyl functionality is obtained by reaction with at least one alkenyl halide, such as allyl chloride and/or allyl bromide.

11. A copolymer dispersion according to claim 1, wherein said alkenyl functionality is obtained by addition of an unsaturated carboxy-functional ester of at least one saturated or unsaturated di, tri or polyfunctional carboxylic acid and at least one hydroxyfunctional allyl ether of at least one di, tri or polyhydric alcohol or at least one di, tri or polyhydric reaction product between at least one alkylene oxide and at least one hydroxyfunctional allyl ether of at least one di, tri or polyhydric alcohol.

12. A copolymer dispersion according to claim 11, wherein said di, tri or polycarboxylic acid is selected from the group consisting of maleic acid, fumaric acid, o-phthalic acid, isophthalic acid, terephthalic acid, tetrahydrophthalic acid, hexahydrophthalic acid, azeleic acid, adipic acid, trimelletic acid and a to a said acid corresponding anhydride.

13. A copolymer dispersion according to claim 6, wherein said alkenyl functionality is obtained by addition of an unsaturated carboxy-functional ester of maleic acid or anhydride and/or fumaric acid at least one saturated or unsaturated di, tri or polyhydric alcohol or at least one di, tri or polyhydric reaction product between at least one alkylene oxide and at least one saturated or unsaturated di, tri or polyhydric alcohol.

14. A copolymer dispersion according to claim 11, wherein said at least one alkylene oxide is ethylene oxide, propylene oxide, 1,3-butylene oxide, 2,4-butylene oxide, cyclohexene oxide, butadiene monoxide and/or phenylethylene oxide.

15. A copolymer dispersion according to claim 11, wherein said di, tri or polyhydric alcohol is selected from the group consisting of 1,ω-diol, a 5,5-di(hydroxyalkyl)-1,3-dioxane, a 2-alkyl-1,3-propanediol, a 2,2-dialkyl-1,3-propanediol, a 2-hydroxy-1,3-propanediol, a 2-hydroxy-2-alkyl-1,3-propanediol, a 2-hydroxyalkyl-2-alkyl-1,3-propanediol, a 2,2-di(hydroxyalkyl)-1,3-propanediol and a dimmer, trimer or polymer of a said di, tri or polyhydric alcohol.

16. A copolymer dispersion according to claim 15, wherein said alkyl is $C_1$–$C_{24}$ alkyl or $C_2$–$C_{24}$ alkenyl.

17. A copolymer dispersion according to claim 11, wherein said di, tri or polyhydric alcohol is selected from the group consisting of 1,4-butanediol, 1,5-pentanediol, 1,6-hexanediol, 1,6-cyclohexane dimethanol, 5,5-di-hydroxymethyl-1,3dioxane, 2-methyl-1,3-propanediol, 2-methyl-2-ethyl-1,3-propane-diol, 2-ethyl-2-butyl-1,3-propanediol, neopentyl glycol, dimethylolpropane, 1,1-di-methylolcyclohexane, glycerol, trimethylolethane, trimethylolpropane, diglycerol, ditrimethylolethane, ditrimethylolpropane, pentaerythritol, dipentaerythritol, anhydroenneaheptitol, sorbitol and mannitol.

18. A copolymer dispersion according to claim 1, wherein said polymerisable monomer is acrylic acid, methacrylic acid, crotonic acid, isocrotonic acid, itaconic acid, maleic anhydride and/or fumaric acid.

19. A copolymer dispersion according to claim 1, wherein said polymerisable monomer is glycidyl acrylate or glycidyl methacrylate.

20. A copolymer dispersion according to claim 1, wherein said polymerisable monomer is acrylamide, methacrylamide and/or ethylimidazolidon methacrylate.

21. A copolymer dispersion according to claim 1, wherein said polymerisable monomer is a $C_1$–$C_{10}$ alkyl acrylate or methacrylate.

22. A copolymer dispersion according to claim 1, wherein said polymerisable monomer is ethylene and/or propylene.

23. A copolymer dispersion according to claim 1, wherein said polymerisable monomer is styrene and/or divinylstrene.

24. A copolymer dispersion according to claim 1, wherein said polymerisable monomer is vinylacetate, vinyl propionate, vinyl versatate and/or dibutyl maleate.

25. A copolymer dispersion according to claim 1, wherein said polymerisable monomer is butadiene and/or isoprene.

26. A copolymer dispersion according to claim 1, comprising at least one polymerisable surfactant and/or a conventional surfactant.

27. A coating composition for use as a decorative and/or protective paint, lacquer, adhesive, or glue comprising as a binder a waterborne copolymer dispersion according to claim 1.

28. A waterborne copolymer dispersion according to claim 1 wherein said at least one alkenyl functional dendritic polymer is present in a concentration of 1–10% by weight.

29. A waterborne copolymer dispersion according to claim 1 wherein said at least one alkenyl functional dendritic polymer is present in a concentration of 2–6% by weight.

* * * * *